(12) United States Patent
Andre et al.

(10) Patent No.: US 10,306,835 B2
(45) Date of Patent: Jun. 4, 2019

(54) REAR DISCHARGE MOWER DECK

(71) Applicant: Exmark Mfg. Co., Inc., Beatrice, NE (US)

(72) Inventors: Timothy D. Andre, Firth, NE (US); Patrick D. Sands, Firth, NE (US)

(73) Assignee: Exmark Mfg. Co., Inc., Beatrice, NE (US)

( * ) Notice: Subject to any disclaimer, the term of this patent is extended or adjusted under 35 U.S.C. 154(b) by 0 days.

(21) Appl. No.: 15/669,076

(22) Filed: Aug. 4, 2017

(65) Prior Publication Data

US 2017/0332552 A1    Nov. 23, 2017

Related U.S. Application Data

(63) Continuation of application No. 14/077,845, filed on Nov. 12, 2013, now Pat. No. 9,756,782.

(51) Int. Cl.
| | |
|---|---|
| *A01D 43/077* | (2006.01) |
| *A01D 34/71* | (2006.01) |
| *A01D 34/66* | (2006.01) |
| *A01D 34/69* | (2006.01) |
| *A01D 43/00* | (2006.01) |
| *A01D 67/00* | (2006.01) |
| *A01D 101/00* | (2006.01) |

(52) U.S. Cl.
CPC ........... *A01D 43/077* (2013.01); *A01D 34/66* (2013.01); *A01D 34/69* (2013.01); *A01D 34/71* (2013.01); *A01D 43/00* (2013.01); *A01D 67/00* (2013.01); *A01D 2101/00* (2013.01)

(58) Field of Classification Search
CPC ...... A01D 43/077; A01D 43/00; A01D 34/66; A01D 34/69; A01D 34/71; A01D 34/005; A01D 67/00; A01D 2101/00
See application file for complete search history.

(56) References Cited

U.S. PATENT DOCUMENTS 5,133,176 A  *  7/1992  Baumann ............. A01D 34/005
                                                        56/17.4
5,212,938 A  *  5/1993  Zenner ................. A01D 34/005
                                                        56/17.5

(Continued)

FOREIGN PATENT DOCUMENTS

EP    1190616 A1  *  3/2002   ........... A01D 34/005
GB     427120 A   *  4/1935   ........... A01D 43/063

*Primary Examiner* — Alicia Torres
*Assistant Examiner* — Adam J Behrens
(74) *Attorney, Agent, or Firm* — James W. Miller

(57) ABSTRACT

A rotary mower cutting deck has a downwardly opening space and rear discharge opening. A center blade and a first side blade rotating in one direction and a second counter-rotating side blade are within the space. A front flow control baffle has a first V-shaped apex located between the unidirectional blades and a second V-shaped apex between the center blade and the counter-rotating side blade. A first V-shaped flow deflector mounted to the first apex points downwardly to cause many grass clippings from the first side blade to be directed to the rear discharge opening without passing to the center blade. A second V-shaped flow deflector mounted to the second apex points upwardly to disrupt the convergence of the air flows and clipping streams from the center and second side blades to maintain the quality of cut and reduce blow out.

3 Claims, 6 Drawing Sheets

(56) References Cited

U.S. PATENT DOCUMENTS

| | | | | |
|---|---|---|---|---|
| 5,628,171 | A * | 5/1997 | Stewart | A01D 42/005 56/2 |
| 6,065,276 | A * | 5/2000 | Hohnl | A01D 34/005 56/320.1 |
| 6,073,430 | A * | 6/2000 | Mullet | A01D 34/685 56/12.8 |
| 6,138,444 | A * | 10/2000 | Torras, Sr. | A01D 34/64 56/14.7 |
| 6,360,517 | B1 * | 3/2002 | Ishimori | A01D 34/71 56/255 |
| 6,996,962 | B1 * | 2/2006 | Sugden | A01D 34/005 56/17.4 |
| 7,543,435 | B2 * | 6/2009 | Imanishi | A01D 34/667 56/320.1 |
| 7,823,373 | B1 * | 11/2010 | Loxterkamp | A01D 34/005 56/320.2 |
| 2008/0086998 | A1 * | 4/2008 | Imanishi | A01D 34/667 56/14.7 |

\* cited by examiner

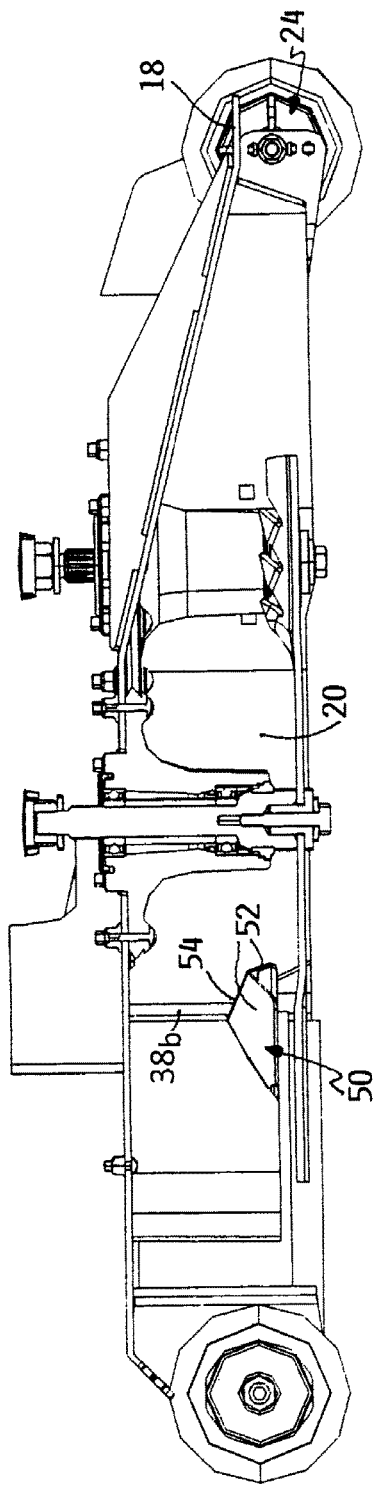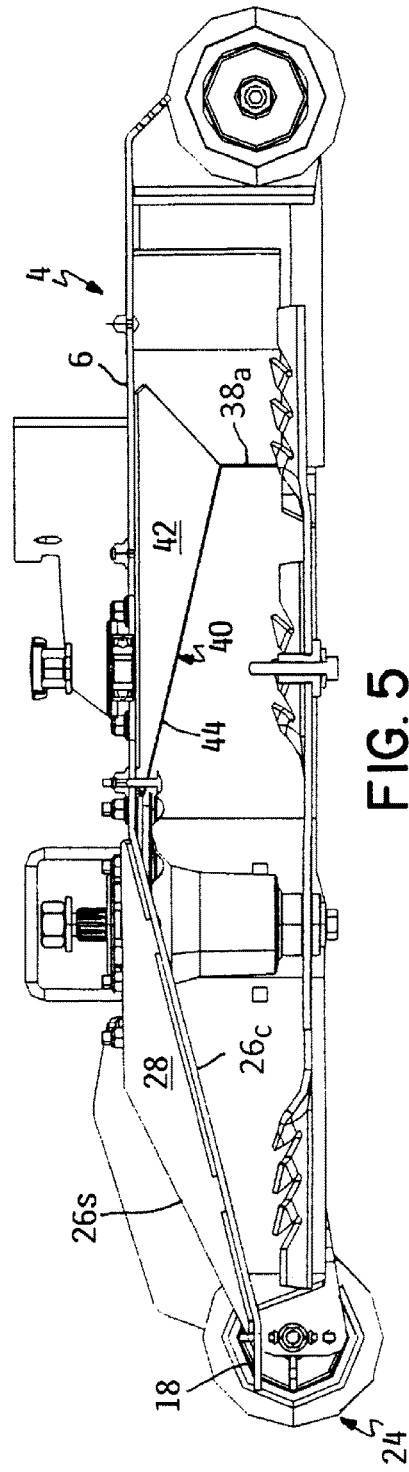

REAR DISCHARGE MOWER DECK

TECHNICAL FIELD

This invention relates to the field of lawn mowers and, more particularly, to a multi-bladed, rear discharge mower deck for connection to a self-propelled traction unit, such as the frame of a riding mower.

BACKGROUND OF THE INVENTION

Many lawn mowers are known which comprise a self-propelled traction unit of some type, such as the frame of a riding mower. Many of these mowers carry a multi-bladed rotary cutting deck having a plurality of blades that rotate in substantially horizontal cutting planes to cut grass over a relatively wide swath as the mower makes a single pass over the ground. Such cutting decks often utilize three cutting blades arranged in a staggered configuration comprising a forward central cutting blade flanked on each side by trailing side cutting blades. Such a fore-and-aft staggered configuration allows the deck to cut an unbroken swath of grass during forward motion of the mower without there being any danger of the blades hitting one another.

In many cases, such multi-bladed cutting decks have used cutting blades that are the same as each other and that rotate in the same direction, i.e. all towards the left side of the deck or the right side of the deck. In many cases, such decks have had a discharge opening arranged on the side of the deck towards which the clippings were directed by the blades to allow the clippings to be thrown outwardly past the side of the deck. However, such a blade arrangement does not work well in a rear discharge deck where one desires that the clippings be thrown out to the rear of the deck through a rear discharge opening. In such a case, the unidirectional rotation of all the cutting blades causes the grass clippings to be thrown out to the rear in a windrow along one side of the deck. This is not aesthetically pleasing and additionally prevents the grass clippings from breaking down into mulch as quickly as they would have broken down had such clippings been more evenly distributed over the cut grass swath.

Various attempts have been made to improve the distribution of clippings to the rear when a rear discharge opening is provided on a mower deck. However, many such attempts have embodied fairly complicated baffling structure on the underside of the mower deck to create entirely separate flow paths for the grass clipping streams generated by the various cutting blades. While this may in some cases cause a more even distribution of clippings, the cost of extensive baffling can be expensive to manufacture and maintain. More significantly, the presence of the baffling can affect how well the cutting blades cut the grass in the first place, as unevenly cut streaks of grass might appear along the lines of the baffling or elsewhere. Thus, there is a need in the art for a rear discharge mower deck that accomplishes a more even and uniform distribution of grass clippings across the width of a rear discharge opening while maintaining a high quality of cut.

SUMMARY OF THE INVENTION

One aspect of this invention relates to a rear discharge mower deck for attachment to the traction frame of a lawn mower. The mower deck comprises a top wall, a front wall, and a pair of side walls forming a downwardly opening space. The space is open along a rear side thereof to form a rear discharge opening through which grass clippings may be discharged. Three rotary cutting blades having substantially vertical spindles are rotatably journalled in the top wall with the cutting blades being positioned beneath the top wall to rotate in horizontal cutting planes within the space defined by the walls to cut grass. The cutting blades comprise a center cutting blade and a pair of side cutting blades that collectively cut a substantially continuous swath of grass during forward motion of the mower deck. The center cutting blade and a first side blade have unidirectional rotation in the same direction as one another and a second side blade counter-rotates in an opposite direction. Two flow deflectors are arranged within the space defined by the walls with a first flow deflector being located generally between the center blade and the first side blade and a second flow deflector being located generally between the center blade and the second side blade. The first and second flow deflectors have cross-sections formed from a pair of side surfaces that join together along an apex. However, the first and second flow deflectors are inverted relative to one another such the apex of the first deflector faces downwardly within the space while the apex of the second deflector faces upwardly within the space.

Another aspect of this invention relates to a mower deck for attachment to the traction frame of a lawn mower. The mower deck comprises a plurality of walls forming a downwardly opening space. At least a pair of cutting blades is positioned within the space to rotate in substantially horizontal cutting planes within the space defined by the walls to cut grass. The blades are disposed laterally adjacent to one another within the space and the blades counter-rotate in opposite directions relative to one another. A flow deflector is located within the space generally between the blades. The flow deflector has a pair of side surfaces that join along an apex. The side surfaces of the flow deflector are inclined relative to vertical and the apex of the flow deflector faces upwardly within the space such that one side surface of the deflector intercepts a first air flow and grass clipping stream generated by one blade to redirect the first air flow and grass clipping stream upwardly within the space and the other side surface of the deflector intercepts a second air flow and grass clipping stream generated by the other counter-rotating blade to also redirect the second air flow and grass clipping stream upwardly with the space.

Yet another aspect of this invention relates to a rear discharge mower deck for attachment to the traction frame of a lawn mower. The mower deck comprises a top wall, a front wall, and a pair of side walls forming a downwardly opening space. The space is open along a rear side thereof to form a rear discharge opening through which grass clippings may be discharged. Three rotary cutting blades having substantially vertical spindles are rotatably journalled in the top wall with the cutting blades being positioned beneath the top wall to rotate in horizontal cutting planes within the space defined by the walls to cut grass. The cutting blades comprise a center cutting blade and a pair of side cutting blades that collectively cut a substantially continuous swath of grass during forward motion of the mower deck. The center cutting blade and a first side blade have unidirectional rotation in the same direction as one another and a second side blade counter-rotates in an opposite direction. A front flow control baffle extends substantially across the width of the top wall and extends downwardly from the top wall with the front flow control baffle being located between the front wall and the cutting blades. The first side blade has greater clearance between the blade and an immediately adjacent portion of the flow control baffle ahead of the first side blade when the first side blade is in a directly fore-and-aft orientation than a clearance between the center blade and an immediately adjacent portion of the flow control baffle ahead of the center blade when the center blade is in a directly fore-and-aft orientation to decrease the ability of the first side blade to pump or move grass clippings to the center blade to promote more even distribution of grass clippings across the rear discharge opening.

BRIEF DESCRIPTION OF THE DRAWINGS

This invention will be described in detail hereafter in the Detailed Description, when taken in conjunction with the following drawings, in which like reference numerals refer to like elements throughout.

FIG. 5 is a cross-sectional side elevational view of the deck of FIG. 3, particularly illustrating the first flow deflector;

FIG. 6 is a cross-sectional side elevational view similar to FIG. 5, but particularly illustrating the second flow deflector.

DETAILED DESCRIPTION

Figure 1:
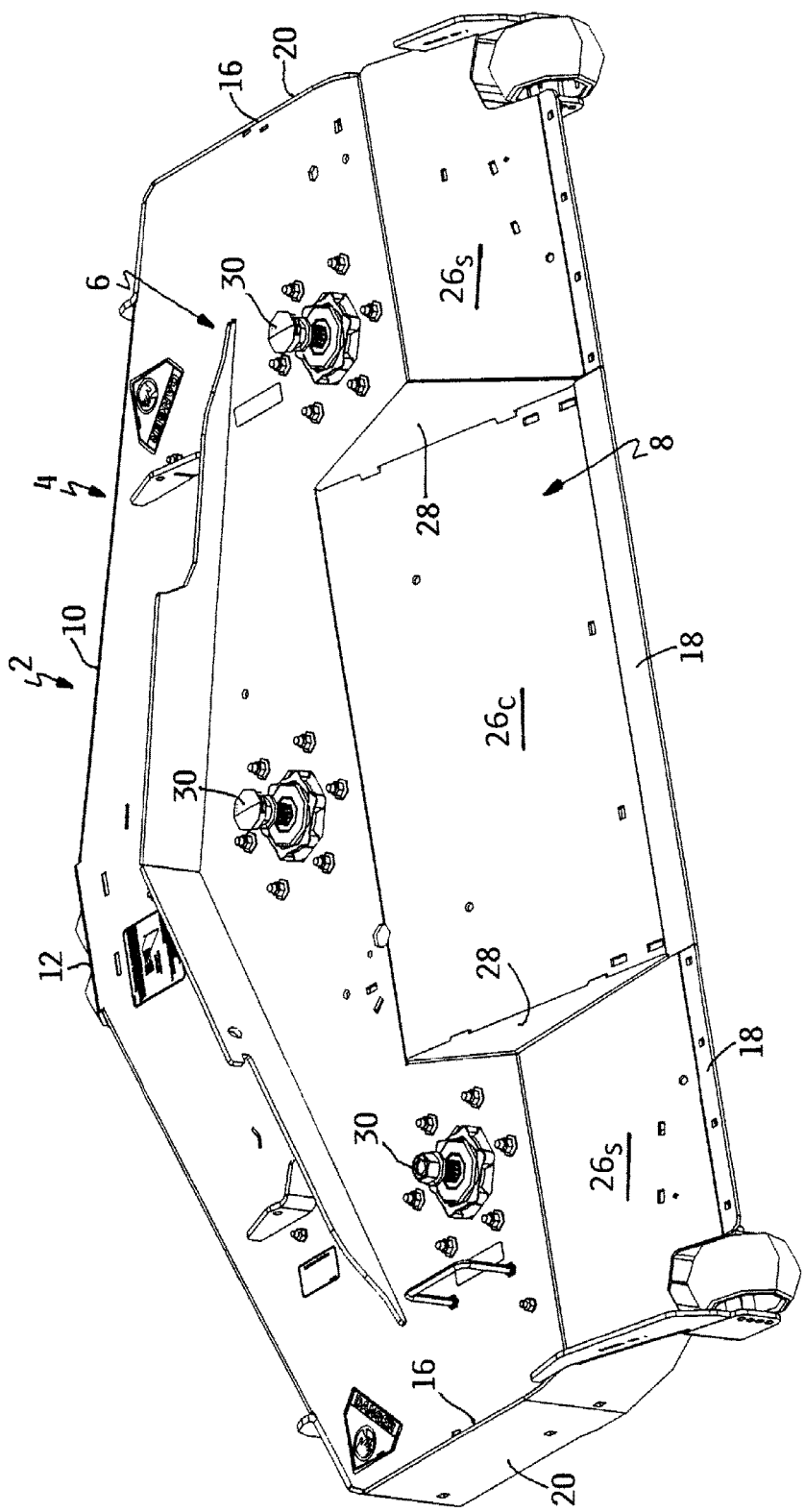
FIG. 1 is a perspective view of the top of a rear discharge mower deck according to one embodiment of this invention.

A mower deck according to one embodiment of this invention is generally illustrated as 2 herein. Deck 2 is suited to be attached in a conventional manner to the self-propelled traction frame of a conventional riding mower. This may be a mower such as the Lazer Z mower which has long been manufactured and sold by Exmark Manufacturing Company, Inc., the assignee of this invention. In the Lazer Z mower, deck 2 is mounted in a mid-mount fashion beneath the frame of a hydraulically driven, zero radius turn mower that carries a seated operator. U.S. Pat. Nos. 5,816,033 and 5,865,020, which are hereby incorporated by reference, describe various aspects of the Lazer Z mower. The traction frame may be of other types as well, such as the Exmark Vantage mower which carries the operator in a standing position atop an operator support platform at the rear of the mower. In addition, deck 2 may be mounted in a forward position on the traction frame, may be a wing deck that is attached to one side of the traction frame, or may be a deck that trails the traction frame and is towed by the traction frame.

Deck 2 has a top wall 4 that includes a substantially horizontal front portion 6 and a downwardly inclined rear portion 8. Top wall front portion 6 has a substantially V-shaped front edge 10 that includes a short central portion 12 that slightly truncates the V-shape of the front edge at the apex of the V-shape. Deck 2 includes a front wall 14 that extends downwardly from top wall front portion 6. Thus, front wall 14 of deck 2 has the same slightly truncated, substantially V-shaped configuration as front edge 10 of top wall front portion 6.

Top wall 4 of deck 2 further includes a pair of laterally spaced side edges 16. Side edges 16 extend rearwardly from the corners of front edge 10 of top wall 4 of deck 2 back along the remaining length of front and rear portions 6 and 8 of top wall 4 of deck 2. Side edges 16 terminate at the rear of deck 2 at the corners of a narrow, substantially horizontal lip 18. Lip 18 forms the extreme rear end of top wall rear portion 8 of deck 2.

Deck 2 includes side walls 20 that extend downwardly from side edges 16 of top wall 4 except that the rear sections 22 of side walls 20 curve laterally to the inside away from side edges 16. Curved rear sections 22 of side walls 20 underlie opposite sides of top wall rear portion 8. There is no rear wall on deck 2 similar to the vertically extending front and side walls 14 and 20 of deck 2. Each curved rear section 22 terminates in a steeply inclined tip 23 whose height rapidly decreases as tip 23 extends inwardly with such inclination of tip 23 minimizing the tendency of grass clippings to hairpin or catch on the tips 23 of rear ends 22. The open lateral distance extending between the curved rear sections 22 of side walls 20, which distance is indicated as w in FIG. 2 and which distance comprises a substantial majority of the width of top wall rear portion 8 of deck 2, is left open to form a laterally extending, rear discharge opening 24 for grass clippings. For these purposes, inclined tips 23 are considered to be part of rear discharge opening 24 due to their rapidly vanishing height resulting from their steep inclination and are thus shown as part of the width w of rear discharge opening 24.

Downwardly inclined rear portion 8 of top wall 4 of deck 2 is formed in a plurality of sections 26. Sections 26 comprise a wide center section $26_c$ and two side sections $26_s$ that are narrower in width than center section $26_c$. Side sections $26_s$ adjoin center section $26_c$ and are connected to opposite lateral sides of center section $26_c$ by triangular, vertically slanted connecting walls 28. Wide center section $26_c$ is longer in a fore-and-aft direction than side sections $26_s$ such that center section $26_c$ protrudes further forwardly than do side sections $26_s$.

Figure 2:
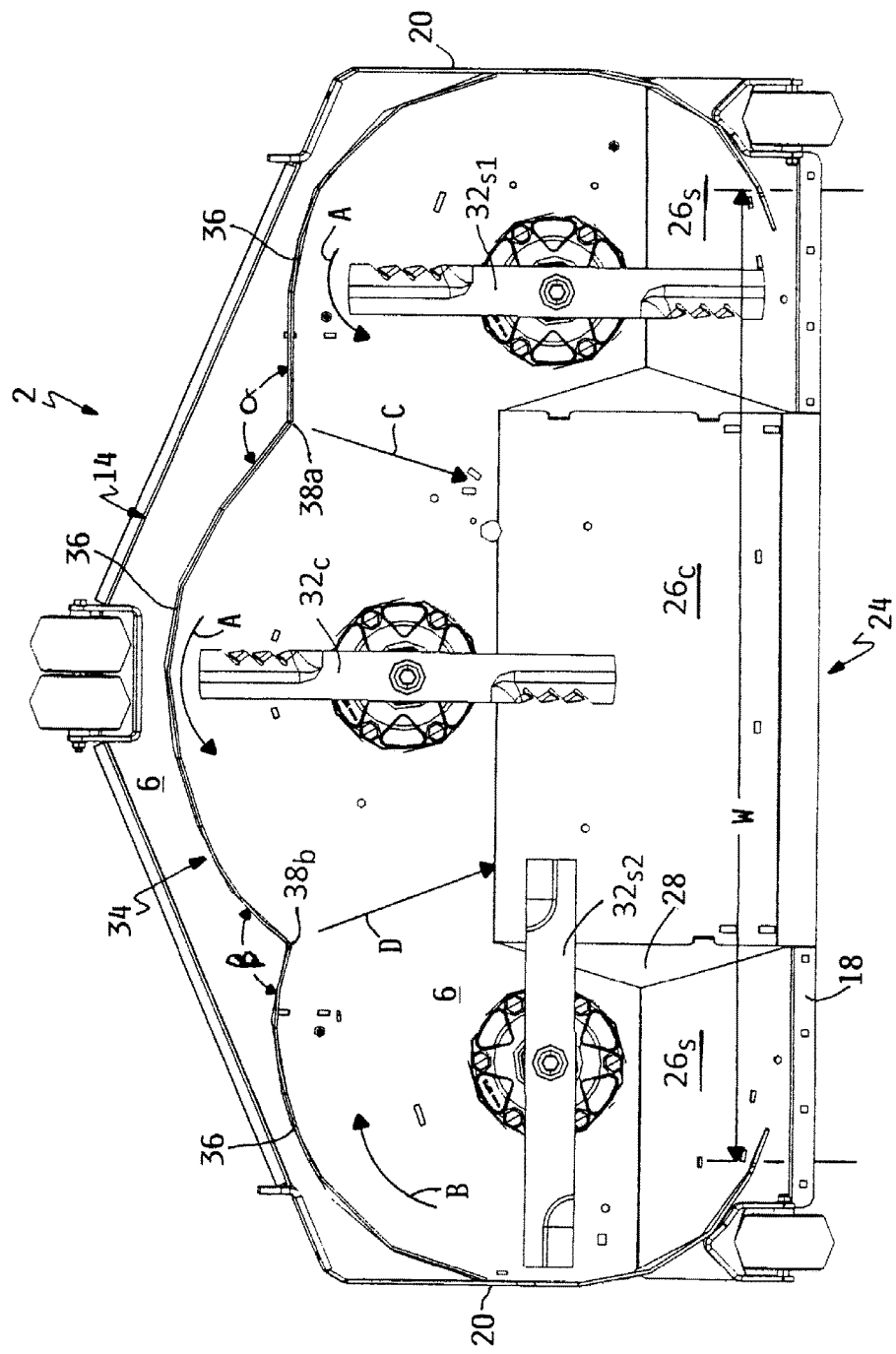
FIG. 2 is a bottom plan view of the deck of FIG. 1, but with first and second flow deflectors having been omitted from the view to more particularly illustrate the shape of a front flow control baffle.

Substantially horizontal front portion 6 of top wall 4 of deck 2 includes three circular holes therein which will mount the spindles 30 of three rotary cutting blades 32 that are located beneath top wall 4 of deck 2. As is shown in FIGS. 1 and 2, the center hole is located directly in front of wide center section $26_c$ of top wall rear portion 8. The side holes are rearwardly staggered relative to the center hole to be located in advance of side sections $26_s$ of top wall rear portion 8 adjacent the sides of the forwardly protruding portion of center section $26_c$. Due to this staggered configuration, the cut grass paths of the three cutting blades 32 will overlap slightly across the width of deck 2 to cut a single generally unbroken swath of grass during each pass of deck 2. Rather than use this staggered blade configuration, it would also be possible to use three cutting blades 32 that are arranged in a straight line side-by-side configuration with the orbits of the side blades overlapping that of the center blade. This alternate blade configuration would require the use of a timed drive system, such as a cogged timing belt, that would prevent the blades from striking one another.

The purpose of center section $26_c$ and side sections $26_s$ forming top wall rear portion 8 is to form rearwardly extending, downwardly inclined ramps to smoothly deflect the grass clippings being generated in the interior of deck 2 by cutting blades 32 in a downward direction as such clippings flow rearwardly towards and eventually through rear discharge opening 24 of deck 2. Center section $26_c$ and side sections $26_s$ all terminate along their rear edges at the same vertical elevation. This is an elevation corresponding to the elevation of lip 18 that forms the terminus of top wall rear portion 8 of deck 2. The elevation of lip 18 is above the elevations of the lower edges of front and side walls 14 and 20 of deck 2. See FIGS. 5 and 6. Given the different fore-and-aft lengths of center section $26_c$ and side sections $26_s$, center section $26_c$ is less steeply inclined than side sections $26_s$.

Referring now to FIG. 2, cutting blades 32 do not all rotate in the same direction. The center blade $32_c$ and one side blade $32_{s1}$ rotate in one direction as indicated by the arrows A when deck 2 is viewed from the underside. The other side blade $32_{s2}$ rotates in an opposite direction as indicated by the arrow B when deck 2 is viewed from the underside. These directions of rotation are achieved by a conventional belt and pulley drive system (not shown) located above top wall 4 of deck 2. This drive system rotates the tops of spindles 30 of cutting blades 32 in the appropriate directions to achieve the directions of blade rotation shown in FIG. 2. Other alternative drive systems, e.g. gearboxes, hydraulic or electric motors, could be used for achieving blade rotation.

A front flow control baffle 34 is provided in the front of deck 2 between front wall 14 of deck 2 and the tips of cutting blades 32. Front flow control baffle 34 extends vertically downwardly from the underside of top wall 4 of deck 2 to an elevation that is substantially equal to or slightly above the elevation of the substantially horizontal planes in which cutting blades 32 rotate. Front flow control baffle 34 extends across deck 2 with the ends of front flow control baffle 34 being joined to side walls 20 of deck 2. Front flow control baffle 34 includes three generally rounded or arcuate sections 36 with some straight portions. One baffle section 36 is positioned ahead of and surrounds a substantial portion of the forward half of the circular orbit of the tip of each cutting blade 32. Adjacent baffle sections 36 of front flow control baffle 34 join with one another to form a pair of substantially vertical, V-shaped apexes $38_a$ and $38_b$. Arrows C and D in FIG. 2 pass through apexes $38_a$ and $38_b$ and have been created in FIG. 2 by bisecting the angles α and β between the joined portions of each pair of adjacent baffle sections 36 that form the apexes $38_a$ and $38_b$ such that arrows C and D can be considered to generally illustrate the rearwardly extending direction in which the respective apexes $38_a$ and $38_b$ are disposed or point. As can be seen in FIG. 2, arrows C and D illustrate that apexes $38_a$ and $38_b$ point toward the midsection of rear discharge opening 24 of deck 2.

Figure 3:
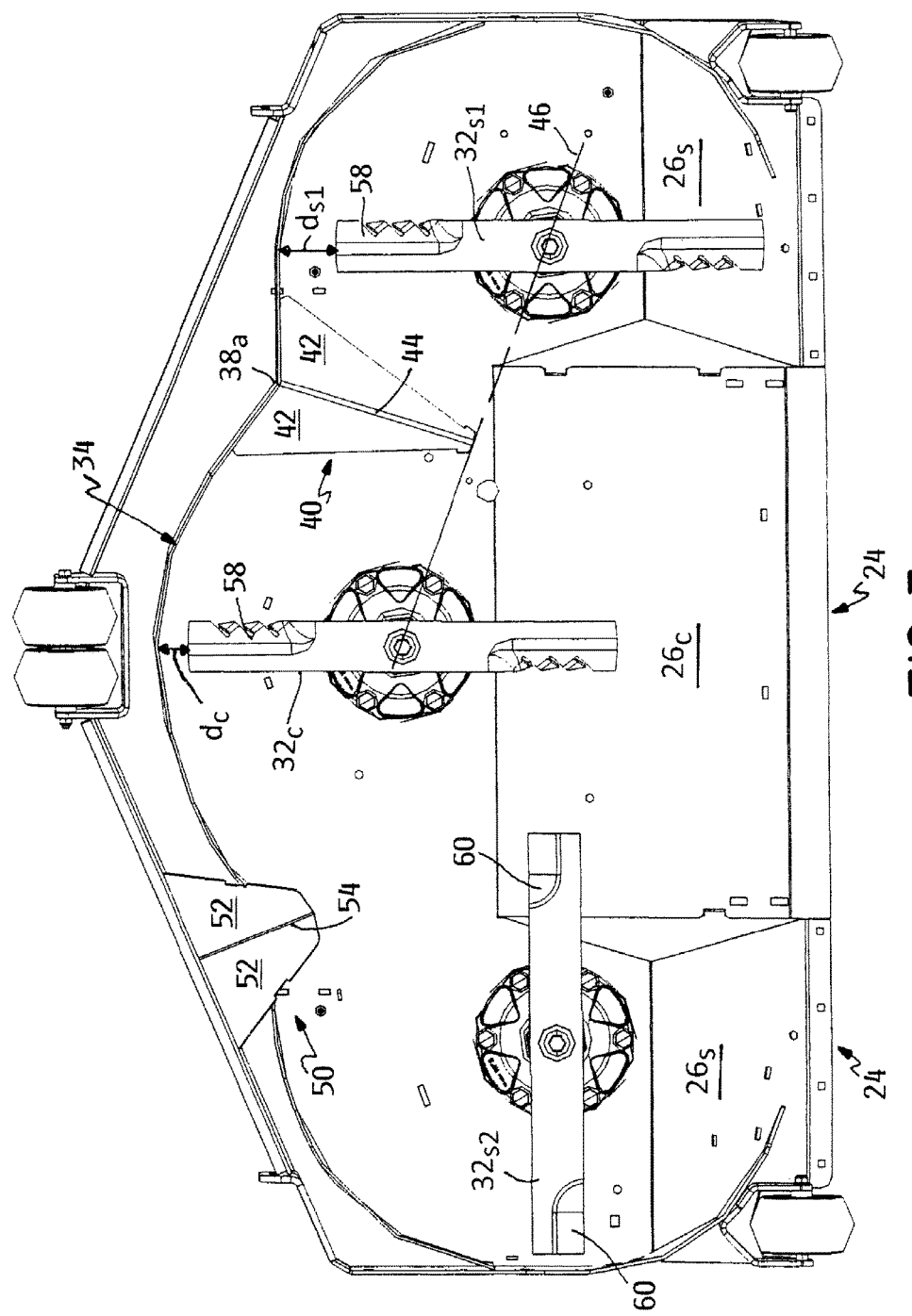
FIG. 3 is a bottom plan view similar to FIG. 2, but illustrating the first and second flow deflectors in their installed conditions within the deck.

Referring to FIG. 3, there are two flow deflectors 40 and 50 that are joined to and extend rearwardly from the apexes $38_a$ and $38_b$ of front flow control baffle 34. The first deflector 40 comprises a V-shaped structure having two triangular side surfaces 42 that form an apex 44 therebetween. First deflector 40 extends downwardly from top wall 4 of deck 2 such that apex 44 of first deflector 40 faces downwardly. In addition, side surfaces 42 of first deflector 40 progressively decrease in height as first deflector 40 extends rearwardly. Thus, first deflector 40 has its greatest depth within deck 2 where first deflector 40 attaches to front flow control baffle 34 with apex 44 of first deflector 40 rising upwardly as first deflector 40 extends rearwardly due to the decrease in the height of side surfaces 42 of first deflector 40. For definitional purposes herein, the word apex is intended to mean throughout this application the elongated zone where the surfaces that form the apex come together to be substantially contiguous to or to border one another, whether such zone is formed as a relatively sharp line or edge, or is truncated by a shape such as a curved surface having a radius or as a planar surface, etc. For example, first deflector 40 is preferably formed by bending a piece of sheet metal into the shape that is shown in the drawings such that apex 44 has a small radius at the bend where side surfaces 42 come together.

First deflector 40 is attached to front flow control baffle 34 at the apex $38_a$ of front flow control baffle 34 that is generally between cutting blades $32_c$ and $32_{s1}$ that rotate in the same direction as one another. When so attached, apex 44 of first deflector 40 is aligned with and extends in the same direction as the direction C of apex $38_a$ of front flow control baffle 34 to which it is attached, as best shown in FIG. 3. In addition, first deflector 40 is fairly long and extends substantially rearwardly so that the rear end of first deflector 40 is closely adjacent to or touches a straight line 46 that connects the centers of rotation of cutting blades $32_c$ and $32_{s1}$. Any portion of first deflector 40 that overlies any of the orbits of cutting blades $32_c$ and $32_{s1}$ is obviously vertically spaced above cutting blades $32_c$ and $32_{s1}$ to prevent cutting blades $32_c$ and $32_{s1}$ from hitting or striking first deflector 40. The purpose of first deflector 40 will be described in more detail hereafter.

Second flow deflector 50 is attached to those portions of front flow control baffle 34 that form the other apex $38_b$ of front flow control baffle 34. Similarly to first deflector 40, second deflector 50 comprises a substantially V-shaped structure having two side surfaces 52 that form an apex 54 therebetween. Second deflector 50 is truncated at the rear of deflector 50 so that side surfaces 52 of second deflector 50 are polygonal in shape rather than triangular as in first deflector 40. In addition, second deflector 50 is much shorter in length than first deflector 40, thus extending far less to the rear as compared to first deflector 40. Second deflector 50 is short enough in length that it lies entirely outside of the orbits of center cutting blade $32_c$ and the counter-rotating side cutting blade $32_{s2}$.

Figure 4:
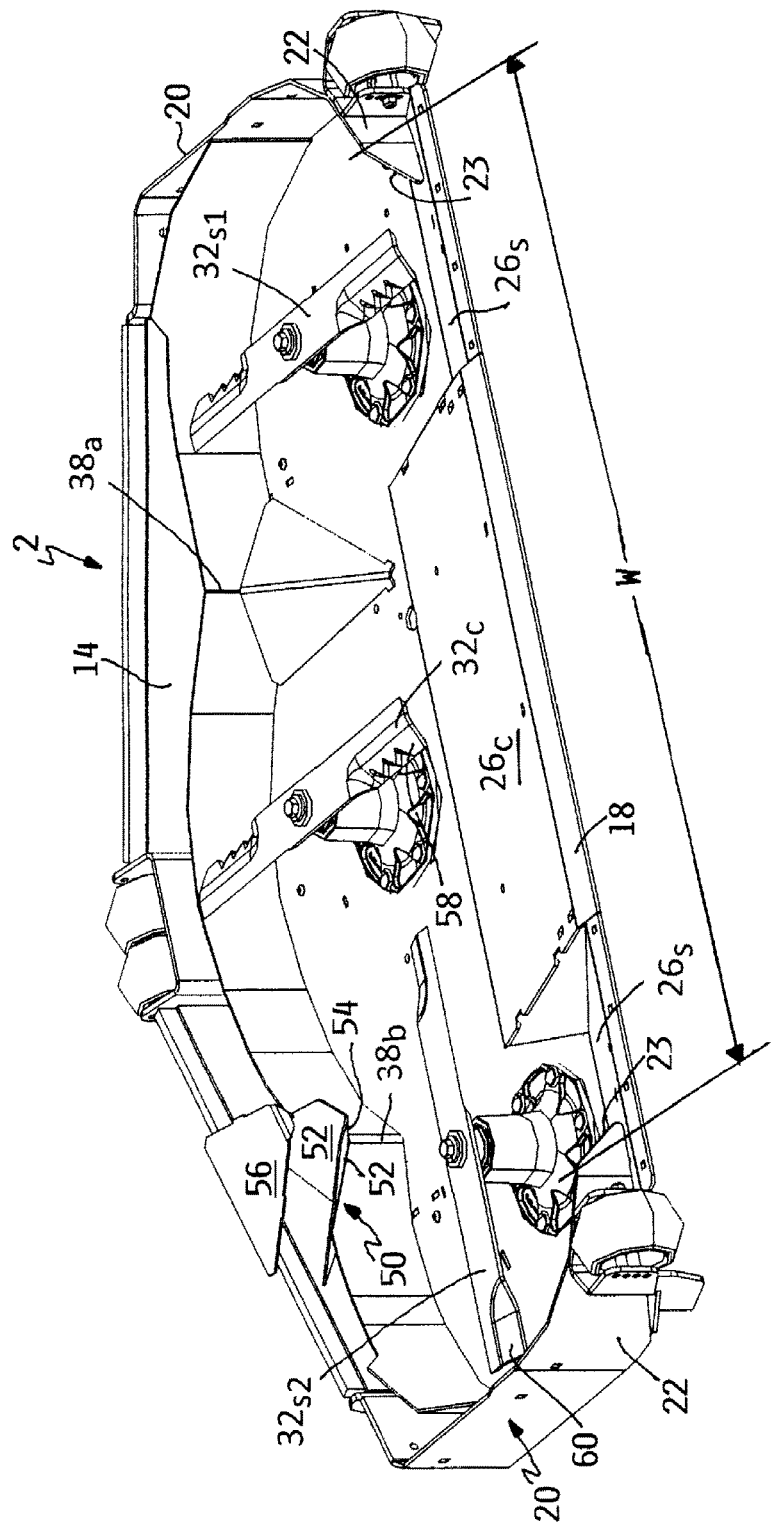
FIG. 4 is a perspective view of the underside of the deck of FIG. 3, particularly illustrating a bottom cover for the second flow deflector in an exploded condition relative to the rest of the flow deflector.

More importantly, second deflector 50 has an inverse orientation compared to the orientation of first deflector 40. Second deflector 50 is positioned at the bottom of front flow control baffle 34 and is seated in a notch in the lower edge of front flow control baffle 34. Second deflector 50 extends forwardly past front flow control baffle 34 with a front end of second deflector 50 attaching to the backside of front wall 14 of deck 2. When so mounted, second deflector 50 actually extends upwardly with apex 54 of second deflector 50 facing upwardly towards top wall 4 of deck 2. Moreover, second deflector 50 has a maximum height along the other apex $38_b$ of front flow control baffle 34 (approximately $\frac{1}{3}^{rd}$ the height of apex $38_b$ where second deflector 50 joins apex $38_b$) that is substantially less than the maximum height of first deflector 40 (at least approximately ½ the height of apex 38a where first deflector 50 joins apex 38a). A cover 56 (as only shown in FIG. 4 in exploded form) may be used to close off the open bottom and the open truncated rear end of second deflector 50 to prevent grass clippings from collecting inside second deflector 50 and to provide additional structural support.

Finally, there is a physical difference between the various cutting blades used in deck 2. The two blades that rotate in the same direction as one another, namely center blade $32_c$ and $32_s$, are blades of the type shown in U.S. Pat. No. 6,675,569, which patent is hereby incorporated by reference. The opposite ends of such blades $32_c$ and $32_{s1}$ have a relatively high, relatively long, upturned sail 58 that is serrated to provide a plurality of sail sections on the trailing edges of the blades adjacent the tips of the blades, e.g. a sail 58 that is approximately 0.88 inches high for the outer most sail section and 1.125 inches high for each of the three narrower inboard sail sections and 6 inches long for blades having a tip to tip length of 20.5 to 24.5 inches. Such high sails 58 generate a relatively strong circumferential and upwardly directed air flow which helps stand the grass up beneath such blades for cutting. By contrast, the side cutting blade $32_{s2}$ that is counter-rotating in FIG. 2 is a lower lift blade, namely a blade without any sail on the trailing edges of the blade or with lower and shorter sails 60 compared to the height and length of the sails 58 on the other cutting blades, e.g. a sail 60 that is approximately 0.63 inches high and 2.5 to 4 inches long for blades having a tip to tip length of 20.5 to 24.5 inches. This lower lift blade $32_{s2}$ generates far less in the way of air flow than do the other two blades, though enough to carry the grass clippings generated by the lower lift blade around in a circumferential direction. Other blade designs providing other lower lift and higher lift characteristics may be used in place of blades 32 as described herein.

The Applicants have found that a deck 2 constructed as described above and equipped with cutting blades 32 as described above provide improved distribution of the grass clippings through rear discharge opening 24 without any deleterious effect on the cutting performance of deck 2. In this regard, improved distribution means fairly even distribution of the grass clippings across rear discharge opening 24 to minimize the clippings being more heavily concentrated in particular areas of rear discharge opening 24. This minimizes undesirable windrowing or clumping of the clippings on top of the cut grass swath. This also allows the clippings to be more evenly dispersed into the cut grass swath for decomposition of the clippings into mulch. While a majority of the clippings will flow down along the downwardly inclined ramp created by center section $26_c$ of the rear portion of deck 2 as they pass through rear discharge opening 24, some of the clippings from the two side cutting blades $32_{s1}$ and $32_{s2}$ will flow down along the ramps created by side sections $26_s$ of the rear portion of deck 2 in achieving even distribution of the clippings.

With regard to the achievement of a fairly even distribution of the clippings, first deflector 40 helps ensure that the grass clippings generated by the two cutting blades $32_c$ and $32_{s1}$ that rotate in the same direction do not all flow substantially around the front portion of center cutting blade $32_c$. The Applicants have found that first deflector 40, being positioned near top wall 4 of deck 2 in the path where the grass clippings tend to flow, intercepts a substantial portion of the grass clippings being generated by the side blade $32_{s1}$ and perhaps some of the grass clippings being generated by the center blade $32_c$ and causes such clippings to be directed out through the portions of rear discharge opening 24 on that side of deck 2 in which the side cutting blade $32_{s1}$ is installed. Without such first deflector 40, the Applicants found that the grass clippings would be less evenly distributed across the width of rear discharge opening 24, and would be more heavily concentrated towards the side of deck 2 having the counter-rotating side blade $32_{s2}$. Moreover, referring to FIG. 3, the tip of side cutting blade $32_{s1}$ is spaced further away from front baffle 34 (e.g. approximately 2.7 inches indicated by distance $ds_1$ in FIG. 3) than the tip of center cutting blade $32_c$ in a corresponding position relative to front baffle 34 (e.g. approximately 1.5 inches as indicated by the distance $d_c$ in FIG. 3). This approximately 80% increase in the tip to baffle spacing of side cutting blade $32_{s1}$ compared to center cutting blade $32_c$ further decreases the ability of side cutting blade $32_{s1}$ to pump or move clippings towards the center of deck 2, thus working in concert with first deflector 40 in achieving more even distribution of clippings across rear discharge opening 24.

Second deflector 50 also serves a function in helping to redirect the convergence of the air flows and clipping streams generated by the center blade and the counter-rotating side blade $32_c$ and $32_{s2}$ where those two air flows and clipping streams would otherwise meet at the other apex $38_b$ on front flow control baffle 34. The second deflector 50 redirects the air flows and clipping streams to reduce the down pressure in this specific area of the deck and allow the uncut grass to remain upright and be cut by the blades 32. Without second deflector 50, the Applicants found that the converging air flows and clipping streams in this location from these two cutting blades $32_c$ and $32_{s2}$ would tend to leave a streak in the cut grass swath in which the grass was not as precisely and evenly cut as in other portions of the cut grass swath. When second deflector 50 was added, the Applicants found that this streak in the grass substantially disappeared. The Applicants believe that this advantageous result is due to the upwardly sloped side surfaces 52 of second deflector 50 redirecting the two converging air flows and clipping streams enough that any deleterious effect on the cut grass swath is mitigated. In addition, second deflector 50 is thought to also cause the clippings generated by the center blade $32_c$ and the counter-rotating side blade $32_{s2}$ to fall out in a more even fashion across the width of rear discharge opening 24 behind these two blades. The shape and size of the sloped side surfaces 52 of second deflector 50 assists to redirect the air flows and clipping streams upward and toward the rear of the deck as opposed to what would have happened with side surfaces having substantially vertical configurations.

Deck 2 as described above improves the performance of deck 2 by improving the distribution of the grass clippings through rear discharge opening 24 while maintaining or improving the quality of cut over that achievable by prior art mowers. This would be true even if all cutting blades 32 used in deck 2 were of the same type, i.e. all higher lift blades. However, an additional incremental improvement is believed to be achieved by having the unidirectional blades $32_c$ and $32_{s1}$ be higher lift blades and the counter-rotating blade $32_{s2}$ be a lower lift blade. While this physical difference in the blades is not strictly necessary and could be dispensed with, it is preferred to provide a rear discharge deck with the best possible performance.

Figure 7:
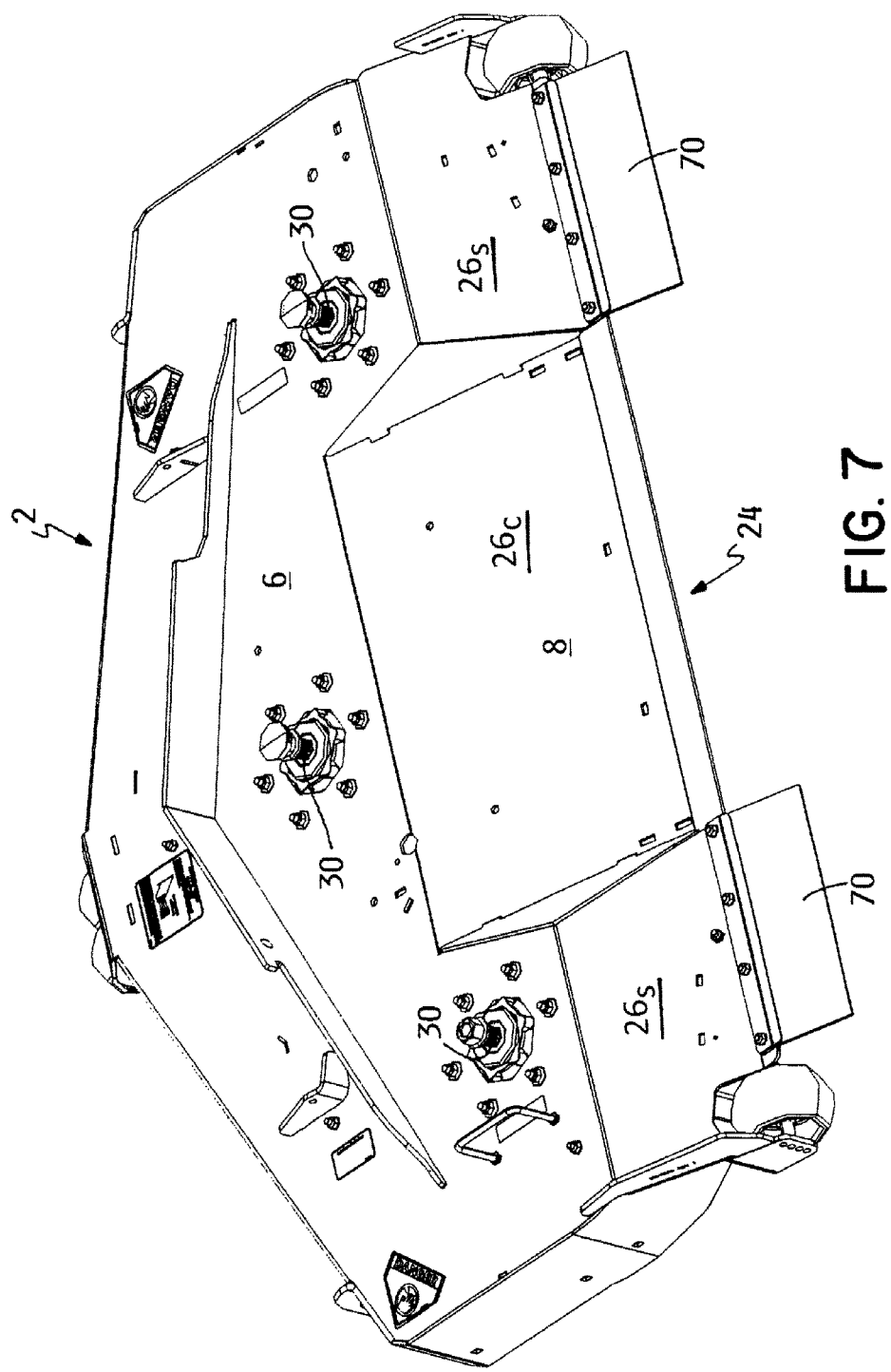
FIG. 7 is a perspective view similar to FIG. 1, but particularly illustrating trailing rear shields behind the downwardly and rearwardly inclined side sections of the rear portion of the top wall of the deck.

Referring to FIG. 7, those portions of rear discharge opening 24 in back of side sections $26_s$ of top wall rear portion 8 could be protected by trailing rear shields 70. This would help prevent any debris or foreign objects from being thrown to the sides of deck 2. In addition, a rearwardly extending shield, chute or tunnel (not shown) could be attached to the rear of deck 2 generally in back of center section $26_c$ to help direct clippings rearwardly.

Various modifications of this invention will be apparent to those skilled in the art. For example, the downwardly inclined rear portion of top wall 4 could be replaced by a top wall 4 which is substantially horizontal over its entire extent. The downwardly and rearwardly inclined ramps would then be constructed of a separate fixed or removable ramp structure that is attached to the underside of top wall 4 of deck 2 over the portions previously occupied by the center and side sections $26_c$ and $26_s$ of top wall rear portion 8. Moreover, the use of second deflector 50 between two counter-rotating blades 32 could be expected to improve the quality of cut and decrease streaking in the grass regardless of the type of deck as long as such deck has two adjacent counter-rotating blades in which the air flows are directed towards one another. Accordingly, the scope of this invention is to be limited only by the appended claims.

The invention claimed is:

1. A mower deck for attachment to the traction frame of a lawn mower, which comprises:
   (a) a plurality of walls forming a downwardly opening space;
   (b) at least a pair of cutting blades positioned within the space to rotate in substantially horizontal cutting planes within the space defined by the walls to cut grass, the blades disposed laterally adjacent to one another within the space and the blades counter-rotating in opposite directions relative to one another; and
   (c) a flow deflector located within the space and positioned generally between the blades, the flow deflector having a pair of side surfaces that join along an apex, wherein the side surfaces of the flow deflector are inclined relative to vertical and the apex of the flow deflector faces upwardly within the space such that one side surface of the flow deflector intercepts a first air flow and grass clipping stream generated by one blade to redirect the first air flow and grass clipping stream upwardly within the space and the other side surface of the flow deflector intercepts a second air flow and grass clipping stream generated by the other counter-rotating blade to also redirect the second air flow and grass clipping stream upwardly within the space, and wherein the apex of the flow deflector extends in a direction which points at a grass discharge opening provided in the walls for allowing grass clippings to be thrown substantially horizontally from the space.

2. A mower deck for attachment to the traction frame of a lawn mower, which comprises:
   (a) a plurality of walls forming a downwardly opening space;
   (b) at least a pair of cutting blades positioned within the space to rotate in substantially horizontal cutting planes within the space defined by the walls to cut grass, the blades disposed laterally adjacent to one another within the space and the blades counter-rotating in opposite directions relative to one another; and
   (c) a flow deflector located within the space and positioned generally between the blades, the flow deflector having a pair of side surfaces that join along an apex, wherein the side surfaces of the flow deflector are inclined relative to vertical and the apex of the flow deflector faces upwardly within the space such that one side surface of the flow deflector intercepts a first air flow and grass clipping stream generated by one blade to redirect the first air flow and grass clipping stream upwardly within the space and the other side surface of the flow deflector intercepts a second air flow and grass clipping stream generated by the other counter-rotating blade to also redirect the second air flow and grass clipping stream upwardly within the space, and wherein the flow deflector is located within a forward portion of the downwardly opening space taken with respect to a forward direction of motion of the deck.

3. A mower deck for attachment to a traction frame of a lawn mower, which comprises:
   (a) a plurality of walls including at least a top wall forming a downwardly opening space;
   (b) at least a pair of cutting blades positioned within the space to rotate in substantially horizontal cutting planes within the space defined by the walls to cut grass, the blades disposed laterally adjacent to one another within the space and the blades counter-rotating in opposite directions relative to one another; and
   (c) a flow deflector located within the space and positioned generally between the blades, the flow deflector having only a substantially inverted V-shape formed by a pair of side surfaces that join along an apex, wherein the side surfaces of the flow deflector are inclined relative to vertical and the apex of the flow deflector faces upwardly within the space such that one side surface of the flow deflector intercepts a first air flow and grass clipping stream generated by one blade to redirect the first air flow and grass clipping stream upwardly within the space and the other side surface of the flow deflector intercepts a second air flow and grass clipping stream generated by the other counter-rotating blade to also redirect the second air flow and grass clipping stream upwardly within the space, wherein all of the flow deflector is positioned entirely within a lower portion of the space with a vertical, substantially unobstructed gap being provided between the flow deflector and the top wall which gap is clear of any other flow deflecting structures, wherein all of the flow deflector is spaced below the top wall along an entire length of the apex, and wherein the apex lies along an uppermost elevation on the flow deflector in every cross-section of the flow deflector taken in a plane perpendicular to the apex of the flow deflector.

\* \* \* \* \*